United States Patent
Kuo et al.

(10) Patent No.: US 8,575,270 B2
(45) Date of Patent: Nov. 5, 2013

(54) COPOLYESTER COMPOSITION AND METHOD FOR PRODUCING COPOLYESTER POLYMER

(75) Inventors: Chih-Ying Kuo, Taipei (TW); Chuan-Hao Hsu, Taipei (TW); Chi-Wei Ciou, Taipei (TW); Li-Ling Chang, Taipei (TW); Roy Wu, Chong-Li (TW)

(73) Assignee: Far Eastern New Century Corporation, Taipei (TW)

( * ) Notice: Subject to any disclaimer, the term of this patent is extended or adjusted under 35 U.S.C. 154(b) by 53 days.

(21) Appl. No.: 13/221,165

(22) Filed: Aug. 30, 2011

(65) Prior Publication Data
US 2012/0116020 A1    May 10, 2012

(30) Foreign Application Priority Data

Nov. 4, 2010  (TW) ................................ 99137950 A

(51) Int. Cl.
*C08F 8/00* (2006.01)
(52) U.S. Cl.
USPC ........................................................ 525/174
(58) Field of Classification Search
USPC .................................... 525/165, 174, 176, 438
See application file for complete search history.

(56) References Cited

U.S. PATENT DOCUMENTS

2010/0201015 A1 * 8/2010 Fujimaki et al. ................. 264/50
2011/0039999 A1 * 2/2011 Witt et al. ..................... 524/210

FOREIGN PATENT DOCUMENTS

WO  WO 2009127556 A1 * 10/2009

* cited by examiner

*Primary Examiner* — Robert Jones, Jr.
(74) *Attorney, Agent, or Firm* — Foley & Lardner LLP

(57) ABSTRACT

A copolyester composition includes: an aliphatic-aromatic copolyester; a coupling agent including a compound having an epoxy functional group; and a cocatalyst including a carboxylate of manganese and a carboxylate of zinc, wherein a weight ratio of the carboxylate of manganese to the carboxylate of zinc ranges from 1:3 to 3:1, and the cocatalyst is present in an amount ranging from 0.03-0.2 part by weight based on 100 parts by weight of the aliphatic-aromatic copolyester.

20 Claims, No Drawings

COPOLYESTER COMPOSITION AND METHOD FOR PRODUCING COPOLYESTER POLYMER

CROSS-REFERENCE TO RELATED APPLICATION

This application claims priority of Taiwanese application no. 099137950, filed on Nov. 4, 2010.

BACKGROUND OF THE INVENTION

1. Field of the Invention

This invention relates to a copolyester composition and a method for producing a thermo-stable copolyester polymer.

2. Description of the Related Art

Polyesters which have a linear structure, such as polyethylene terephthalate (PET) and polybutylene terephthalate (PBT), have been widely used for vacuum forming plastic products because of their superior mechanical and optical properties and great chemical resistance. However, the polyesters with linear structure and relatively low molecular weight exhibit deficient melting strength that adversely influences the applicability of the polyesters for manufacture, especially application for a blown film process or a foaming process. To overcome the aforesaid problems, methods of introducing side chains into the linear polyester, i.e., modifying the linear polyester into a branched polyester, with the use of a coupling agent (also known as a chain extender) are conducted such that the molecular weight and the melting strength of the polyester are improved and the resulting branched polyesters are suitable for subsequent processing.

U.S. Pat. No. 6,506,852 discloses a method for producing high molecular weight polyester pellets by heating and pelletizing a polyester mixture. The polyester mixture includes: (a) a linear saturated polyester; (b) a coupling agent composed of a bifunctional epoxide ingredient and a polyfunctional epoxide ingredient; and (c) a coupling reaction catalyst, e.g., a metal salt of a carboxylic acid. The coupling agent is added in the mixture for increasing the swell (degree of swelling) and the amount of long chain branches of the linear saturated polyester so as to produce a polyester product having improved melting strength. The coupling reaction catalyst is added for accelerating the rate of crystallization reaction, thereby leading to a highly polymerized polyester product. In the preferred embodiments of the patent, Al.Na salt of Sasol wax and manganese(II) acetate are respectively used as the catalyst.

In U.S. Pat. No. 6,841,106, the aforesaid polyester mixture is also disclosed to be used for producing a foamed article. The coupling reaction catalysts used in this patent are manganous acetate tetrahydrate, calcium stearate, lithium stearate, or combinations thereof.

However, various problems such as pyrolysis occur during the aforesaid manufacturing process and a resulting polyester product thus made exhibits poor thermostability. The present inventors observed that the species and the amount of the coupling reaction catalyst may influence the polymerization reaction and the physical property of the resulting polyester product. When a carboxylate of sodium or a carboxylate of manganese is used as the catalyst, the catalyst efficiency is undesirable such that the polymerization reaction is likely to be incomplete, thereby resulting in a poor melting strength of the resulting polyester product.

It is desired in the art to provide a catalyst suitable for polymerization reaction of a polyester or a copolyester composition, which may allow the polymerization reaction to proceed efficiently, thereby obtaining a resulting polyester product with superior physical properties.

SUMMARY OF THE INVENTION

Therefore, the object of the present invention is to provide a copolyester composition and a method for producing a copolyester polymer that can overcome the aforesaid drawbacks associated with the prior art.

According to one aspect of the present invention, a copolyester composition comprises: an aliphatic-aromatic copolyester; a coupling agent including a compound having an epoxy functional group; and a cocatalyst including a carboxylate of manganese and a carboxylate of zinc, wherein a weight ratio of the carboxylate of manganese to the carboxylate of zinc ranges from 1:3 to 3:1, and the cocatalyst is present in an amount ranging from 0.03-0.2 part by weight based on 100 parts by weight of the aliphatic-aromatic copolyester.

According to another aspect of the present invention, a method for producing a thermo-stable copolyester polymer comprises reacting an aliphatic-aromatic copolyester with a coupling agent that includes an epoxy functional group in the presence of a cocatalyst. The cocatalyst includes a carboxylate of manganese and a carboxylate of zinc at a weight ratio ranging from 1:3 to 3:1, and the cocatalyst is present in an amount ranging from 0.03-0.2 part by weight based on 100 parts by weight of the aliphatic-aromatic copolyester.

DETAILED DESCRIPTION OF THE PREFERRED EMBODIMENTS

According to the preferred embodiment of the present invention, a copolyester composition includes: an aliphatic-aromatic copolyester; a coupling agent including a compound having an epoxy functional group; and a cocatalyst.

The cocatalyst includes a carboxylate of manganese and a carboxylate of zinc, and the weight ratio of the carboxylate of manganese to the carboxylate of zinc ranges from 1:3 to 3:1. Preferably, the weight ratio ranges from 1:2 to 2:1. The cocatalyst is present in an amount ranging from 0.03-0.2 part by weight based on 100 parts by weight of the aliphatic-aromatic copolyester. Preferably, the amount of the cocatalyst ranging from 0.04-0.15 part by weight, more preferably, 0.05-0.1 part by weight, based on 100 parts by weight of the aliphatic-aromatic copolyester.

When the amount of the cocatalyst is lower than 0.03 part by weight, the catalyst efficiency is relatively low such that the polymerization reaction between the aliphatic-aromatic copolyester and the coupling agent is conducted insufficiently, thereby resulting in a poor melting strength of a resulting copolyester polymer. On the other hand, when the amount of the cocatalyst is higher than 0.2 part by weight, the polymerization reaction is overly accelerated such that gel formation appears which adversely influences a subsequent manufacturing process.

The carboxylate of manganese and the carboxylate of zinc of the cocatalyst refer to a carboxylate containing a manganese ion or a zinc ion. Examples of the carboxylate include, but are not limited to, salt of aliphatic carboxylic acid, salt of aromatic carboxylic acid, salt of polycarboxylic acid, or combinations thereof. Preferably, the carboxylate of manganese and the carboxylate of zinc are respectively a $C_1$ to $C_{18}$ aliphatic carboxylate of manganese and a $C_1$ to $C_{18}$ aliphatic carboxylate of zinc. More preferably, the carboxylate of manganese is manganese acetate, manganese stearate, or the combination thereof, and the carboxylate of zinc is zinc acetate, zinc stearate, or the combination thereof.

The aliphatic-aromatic copolyester of the copolyester composition may be a commercially available product or may be produced by a conventional method known to one skilled in the art. For example, the aliphatic-aromatic copolyester may be produced by reacting an aliphatic diacid with an aromatic diol or by reacting an aromatic diacid with an aliphatic diol. In addition, the aliphatic-aromatic copolyester may also be a biodegradable copolyester.

Preferably, the aliphatic-aromatic copolyester includes a first repeating unit represented by the following formula (I) and a second repeating unit represented by the following formula (II):

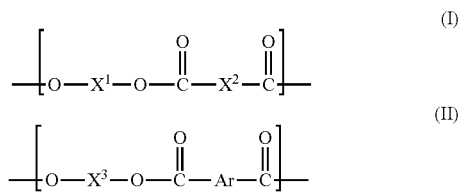

wherein $X^1$ and $X^3$ are independently $C_2$ to $C_{20}$ linear or branched alkylene, $X^2$ is $C_3$ to $C_{40}$ linear or branched alkylene, and Ar is $C_6$ to $C_{20}$ arylene. The mole ratio of the first repeating unit of formula (I) to the second repeating unit of formula (II) ranges from 0.1:99.9 to 99.9:0.1.

Preferably, the aliphatic-aromatic copolyester has a weight average molecular weight ranging from 30,000 to 50,000 and a melting point ranging from 50° C. to 200° C.

Preferably, the aliphatic-aromatic copolyester is selected from the group consisting of butylene glycol adipate-terephthalate copolymer (commercially available from such as Far Eastern New Century Corporation under a trade name of FEPOL®, BASF Corporation under a trade name of Ecoflex®, IRE Chemicals Ltd. under a trade name of Enpol® 8000, Eastman Chemicals Company under a trade name of EastarBio® etc.), butylene glycol succinate-terephthalate copolymer (commercially available from such as DuPont Company under a trade name of Biomax®, etc.), tetramethyladipate-terephthalate copolymer, and combinations thereof. In the preferred embodiment of the present invention, the aliphatic-aromatic copolyester is butylene glycol adipate-terephthalate copolymer.

In the copolyester composition of the present invention, the coupling agent serves as a chain extender that is capable of reacting with the aliphatic-aromatic copolyester to increase the molecular weight of the resulting polymer. Based on 100 parts by weight of the aliphatic-aromatic copolyester, the coupling agent of the copolyester composition is present in an amount ranging from 0.3-2.0 parts by weight, preferably, 0.4-1.5 parts by weight, and more preferably, 0.5-1.0 part by weight. When the amount of the coupling agent is lower than 0.3 part by weight, a resulting copolyester polymer would have a poor melting strength that is unsuitable for a blown film process. On the other hand, when the amount of the coupling agent is larger than 2.0 parts by weight, undue cross-linking appears during the polymerization reaction which results in undesirable gel formation that causes clog of a filter of a manufacture apparatus.

Preferably, the coupling agent is prepared by polymerizing at least one first monomer of an epoxidized acrylic ester that includes an epoxy functional group, and a second monomer selected from the group consisting of acrylic ester based monomer, styrene based monomer, and the combination thereof. More preferably, the polymerization reaction for preparing the coupling agent is proceeded in the presence of an initiator such as 2,2'-azobis(2-methylpropionitrile) (AIBN), benzyl peroxide (BPO), or any other suitable agents.

The first monomer of the coupling agent may be, for example, glycidyl methacrylate (GMA) or glycidyl acrylate.

The acrylic ester based monomer of the second monomer of the coupling agent may be, for example, methyl methacrylate (MMA), ethyl methacrylate (EMA), n-butyl methacrylate (n-BMA), tert-butyl methacrylate (t-BMA), isobornyl methacrylate (IBMA), trifluoroethyl methacrylate, methyl acrylate (MA), butylacrylate (BA), lauryl acrylate (LA), stearyl acrylate (SA), benzyl methacrylate (BzMA), 2-phenoxy ethyl methacrylate or phenoxy ethyl acrylate.

The styrene based monomer of the second monomer of the coupling agent may be, for example, styrene (ST), alpha-methylstyrene, p-methylstyrene, tert-butylstyrene, or vinyl toluene.

Preferably, the first monomer and the second monomer are respectively present in amounts of 30-50 wt % and 50-70 wt % based on the weight of the coupling agent.

Preferably, the coupling agent has a weight average molecular weight ranging from 5,000 to 20,000 and an epoxy equivalent weight ranging from 200 to 500 g/eq.

It should be noted that other additives or agents, such as coloring agent, anti-static agent, fire retardant, foaming agent, anti-UV stabilizer, anti-skid agent, plasticizer, inorganic filler, antioxidant, lubricant, etc., may be added in the copolyester composition of the present invention in accordance with the processing or application requirements. Preferably, the total amount of the additives and the agents is 0-30 parts by weight based on 100 parts by weight of the aliphatic-aromatic copolyester.

The copolyester composition of the present invention can be used to form a modified copolyester polymer. The method for producing the modified copolyester polymer includes reacting an aliphatic-aromatic copolyester with a coupling agent that includes an epoxy functional group in the presence of a cocatalyst. The cocatalyst includes a carboxylate of manganese and a carboxylate of zinc at a weight ratio ranging from 1:3 to 3:1, and the cocatalyst is present in an amount ranging from 0.03-0.2 part by weight based on 100 parts by weight of the aliphatic-aromatic copolyester.

The method further includes the step of preparing the coupling agent by polymerizing at least one first monomer of an epoxidized acrylic ester that includes an epoxy functional group, and a second monomer selected from the group consisting of acrylic ester based monomer, styrene based monomer, and the combination thereof.

The amounts and species of the carboxylate of manganese, the carboxylate of zinc of the cocatalyst, the aliphatic-aromatic copolyester, the coupling agent, and the first and second monomers are as described above.

The method can be conducted using a conventional machine known to one skilled in the art. For example, the copolyester composition of this invention can be melted and blended in a single screw extruder or a twin screw extruder and then extruded, followed by cutting into a plurality of pellets using a pelletizer. The resulting copolyester pellets may be subjected to further processes, such as a blown film process or a foaming process, so as to form articles with different configurations.

Example

Sources of Chemicals

1. Butylene glycol adipate-terephthalate copolymer: commercially available from Far Eastern New Century Corporation under a trade name of FEPOL®, having a melting temperature of 120° C. and a glass transition temperature of about −33° C.
2. Manganese acetate (MnAc): commercially available from SHOWA Corp.
3. Zinc acetate (ZnAc): commercially available from ALDRICH Co.
4. Manganese stearate (MnSt): commercially available from MP Biomedicals, LLC.
5. Zinc stearate (ZnSt): commercially available from Coin Chemical Industrial Co. Ltd.
6. Sodium stearate (Nast): commercially available from ACROS.
7. Sodium acetate (NaAc): commercially available from SHOWA Corp.
8. Ionomer Sodium salt: commercially available from Honeywell International Inc.
9. Zinc oxide (ZnO): commercially available from Shimakyu's Pure Chemicals.
10. Inorganic talc powder: commercially available from Taiwan JATERY Chemical Co. Ltd. under a trade name of P2000.

Preparation of Coupling Agents Having a Functional Epoxy Group

Predetermined amounts of styrene, methyl methacrylate, and glycidyl methacrylate were uniformly mixed, followed by addition of azobisisobutyronitrile (AIBN) serving as an initiator with stirring so as to obtain a solution. The solution was dropped into toluene as a solvent in a 5 L glass reaction tank. Radical polymerization reaction was conducted for 2 hours at a temperature of 85±5° C. followed by vacuum drying to remove the toluene solvent so as to obtain a compound having an epoxy functional group which is in the form of white powders and is used as a coupling agent.

Three coupling agents A, B, and C were prepared respectively. The amounts of styrene, methyl methacrylate, glycidyl methacrylate, and AIBN for each of the coupling agents A, B, and C are shown in Table 1.

For each of the coupling agents A, B, and C, epoxy equivalent weight (EEW) was measured by a standard of ASTM D1652, weight average molecular weight ($M_w$), number average molecular weight ($M_n$), and polydispersity index (PDI) were determined by gel permeation chromatography (GPC), and glass transition temperature was measured using differential scanning calorimetry (DSC). The measurement results are shown in Table 1.

TABLE 1

| | Coupling agent | A | B | C |
|---|---|---|---|---|
| Monomer | Styrene (wt %) | 45 | 45 | 45 |
| | Methyl methacrylate (wt %) | 10 | 10 | 25 |
| | Glycidyl methacrylate (wt %) | 45 | 45 | 30 |
| Initiator | AIBN (parts by weight*) | 4.5 | 1.5 | 4.5 |
| Physical Property | Glass transition temperature (° C.) | 62.2 | 64.8 | 70 |
| | Weight average molecular weight ($M_w$) | 9857 | 19542 | 9891 |
| | Number average molecular weight ($M_n$) | 5107 | 10231 | 4835 |
| | Polydispersity Index (PDI) | 1.93 | 1.91 | 2.04 |
| | Epoxy equivalent weight (EEW) | 353 | 360 | 473 |

*The amount of AIBN is based on 100 parts by weight of the total weight of the monomers, i.e., styrene, methyl methacrylate, and glycidyl methacrylate.

Examples 1 to 4

100 parts by weight of the butylene glycol adipate-terephthalate copolymer (dried at a temperature of 80° C. for 8 hours to ensure the moisture content thereof is not higher than 220 ppm), 0.65 part by weight of the coupling agent A, and 0.065 part by weight of a cocatalyst were melted and blended in a HAAKE plastometer at a temperature of 200° C. and a rotating speed of 50 rpm for 20 minutes so as to obtain copolyester polymers of Examples 1 to 4. The species and amounts of the cocatalysts for Examples 1 to 4 are shown in Table 2.

During the melting and blending process, torque (unit: N·m) of each of the copolyester polymers of Examples 1 to 4 was measured using the HAAKE plastometer every 30 seconds. The results are shown in Table 2. A higher torque indicates a higher melting strength of the copolyester polymer, which implies that the polymerization reaction between the aliphatic-aromatic copolyester and the coupling agent is more sufficient.

Comparative Examples 1 to 7 (CE1-CE7)

The preparation of each of the copolyester polymers of Comparative Examples 1 to 7 was the same as that in Examples 1 to 4, except that the cocatalyst was dispensed with in Comparative Example 1, and that the species and/or amounts of the catalyst used in Comparative Examples 2 to 7 were different from those in Examples 1 to 4. The species and amounts of cocatalyst or catalyst and the measurement results for each of Comparative Examples 1 to 7 are shown in Table 2.

TABLE 2

| Example/ Comparative Example (CE) | Cocatalyst/ catalyst | Torque (N · m) | | | | Maximum value | Response time for maximum torque (min) |
|---|---|---|---|---|---|---|---|
| | | 3 min | 5 min | 7 min | 10 min | | |
| 1 | MnAc/ZnAc (1:1) | 2.25 | 2.08 | 1.56 | 1.40 | 2.30 | 4.0 |
| 2 | MnAc/ZnSt (1:1) | 1.50 | 1.74 | 1.30 | 1.10 | 1.80 | 3.5 |
| 3 | MnAc/ZnAc (3:1) | 1.20 | 1.60 | 1.40 | 1.30 | 1.60 | 5.0 |
| 4 | MnAc/ZnAc (1:3) | 1.30 | 1.20 | 1.10 | 1.00 | 1.30 | 2.7 |
| CE1 | — | 0.30 | 0.35 | 0.40 | 0.60 | 0.88 | >10.0 |

TABLE 2-continued

| Example/ Comparative Example (CE) | Cocatalyst/ catalyst | Torque (N·m) | | | | Maximum value | Response time for maximum torque (min) |
|---|---|---|---|---|---|---|---|
| | | 3 min | 5 min | 7 min | 10 min | | |
| CE2 | NaAc | 0.20 | 0.35 | 0.50 | 1.22 | 1.30 | >10.0 |
| | NaSt | 0.30 | 0.40 | 0.75 | 1.50 | 1.55 | >10.0 |
| | Na-ionomer | 0.28 | 0.32 | 0.42 | 0.70 | 1.02 | >10.0 |
| CE3 | MnAc | 1.30 | 1.50 | 1.60 | 1.80 | 1.88 | 9.0 |
| | MnSt | 0.50 | 0.72 | 1.40 | 1.78 | 1.78 | 10.0 |
| CE4 | ZnO | 0.30 | 0.50 | 0.62 | 0.88 | 0.88 | 10.0 |
| | ZnAc | 0.9 | 0.90 | 0.72 | 0.60 | 0.98 | 4.0 |
| | ZnSt | 1.56 | 1.66 | 1.14 | 0.70 | 1.75 | 4.0 |
| CE5 | MnSt/NaSt (1:1) | 0.50 | 0.70 | 1.05 | 1.60 | 1.60 | 9.5 |
| CE6 | MnAc/ZnAc (4:1) | 1.00 | 1.25 | 1.30 | 1.18 | 1.30 | 6.0 |
| CE7 | MnAc/ZnAc (1:4) | 0.91 | 1.10 | 0.92 | 0.80 | 1.10 | 5.0 |

As shown in Table 2, in Comparative Example 1, in which no catalyst was used, the copolyester polymer has a torque lower than 1 N·m that indicates a deficient polymerization reaction between the butylene glycol adipate-terephthalate copolymer and the coupling agent A. Moreover, the maximum torque of Comparative Example 1 is quite low, indicating a low melting strength of the resulting copolyester polymer. It may be concluded that a catalyst is required for the polymerization reaction of the copolyester composition.

In Comparative Example 4, the maximum torque was achieved in a relatively short time, i.e., 4.0 minutes. However, the torque value decreased with time, which indicated that the resulting copolyester polymer exhibited inferior thermostability and was degraded by virtue of pyrolysis reaction which might be accelerated by ZnSt catalyst.

From the result of Comparative Example 5, in which Response time of maximum torque was 9.5 minutes, the catalyst efficiency of the cocatalyst composed of manganese stearate (MnSt) and sodium stearate (NaSt) is worse. Although the maximum torque thereof is as high as 1.6 N·m, the long response time of the maximum torque would adversely influence subsequent processing. The response times of the maximum torques of Example 3 and Comparative Example 7 are both five minutes, but the maximum torque of Example 3, i.e., 1.6 N·m, is much higher than that of Comparative Example 7, i.e., 1.1 N·m. Both Example 4 and Comparative Example 6 have a maximum torque of 1.3 N·m, but the response time of maximum torque of Example 4, i.e., 2.7 minutes, is much shorter than that of Comparative Example 6, i.e., 6.0 minutes.

The maximum torque of each of Examples 1 to 4 ranges from 1.30 to 2.30 N·m, and the response time of maximum torque thereof ranges from 2.7 to 5.0 minutes. When the test time becomes longer, the maximum torques of Examples 1 to 4 are not less than 1 N·m, which indicates the polymerization reaction between the butylene glycol adipate-terephthalate copolymer and the coupling agent A is accelerated by the cocatalyst, i.e., the carboxylate of manganese and the carboxylate of zinc. In particular, Example 1 that includes the cocatalyst containing manganese acetate (MnAc) and zinc acetate (ZnAc) at a weight ratio of 1:1 exhibits the most superior properties among Examples 1 to 4.

Examples 5 to 7 and Comparative Examples 8 and 9

The preparation of each of the copolyester polymers of Examples 5 to 7 and Comparative Examples 8 and 9 was the same as that in Example 1, except that the amounts of the cocatalyst and the coupling agent A were varied to determine the effect of the amounts of the cocatalyst and the coupling agent A on the resulting copolyester polymer. The amounts of the cocatalyst and the coupling agent A thus used are shown in Table 3. The maximum torque of each of Examples 5 to 7 and Comparative Examples 8 and 9 was measured, and the occurrence of gelation was observed. The results are shown in Table 4.

TABLE 3

| Example/ Comparative Example (CE) | Cocatalyst | Amount of coupling agent (parts by weight*) | Amount of cocatalyst (parts by weight*) |
|---|---|---|---|
| CE8 | MnAc/ZnAc(1:1) | 0.1 | 0.01 |
| 5 | MnAc/ZnAc(1:1) | 0.3 | 0.03 |
| 1 | MnAc/ZnAc(1:1) | 0.65 | 0.065 |
| 6 | MnAc/ZnAc(1:1) | 1.5 | 0.15 |
| 7 | MnAc/ZnAc(1:1) | 2 | 0.2 |
| CE9 | MnAc/ZnAc(1:1) | 2.5 | 0.25 |

*The amounts of the coupling agent and the cocatalyst are based on 100 parts by weight of butylene glycol adipate-terephthalate copolymer.

TABLE 4

| Example/ Comparative Example (CE) | Maximum torque (N·m) | Response time of maximum torque (min) | Gelation |
|---|---|---|---|
| CE8 | 0.2 | 18.3 | X |
| 5 | 1.0 | 7.2 | X |
| 1 | 2.3 | 4.0 | X |
| 6 | 5.3 | 2.6 | X |
| 7 | 7.1 | 2.3 | X |
| CE9 | 8.7 | 2.6 | ○ |

As shown in Tables 3 and 4, when the amount of the cocatalyst was less than 0.03 part by weight and the amount of the coupling agent was less than 0.3 part by weight (e.g., CE8), a relatively low maximum torque was observed. On the other hand, when the amount of the cocatalyst is higher than 0.2 part by weight and the amount of coupling agent is higher than 2.0 parts by weight (e.g. CE9), gelation occurs, which makes subsequent processing difficult.

In particular, based on the inventors' experiments, preferably, the amounts of the cocatalyst, MnAc/ZnAc, and the coupling agent A are respectively adjusted to be 0.065 and 0.65 part by weight based on 100 parts by weight of butylene glycol adipate-terephthalate copolymer so as to conform to subsequent processing requirements, especially for a twin screw extruder process.

Example 8

Preparation of Film Bag from the Copolyester Polymer

First Processing in Twin Screw Extruder 100 kg of butylene glycol adipate-terephthalate copolymer was put in a primary feed tank of a twin screw extruder, and 0.65 kg of the coupling agent A and 0.065 kg of a cocatalyst (containing manganese acetate (MnAc) and zinc acetate (ZnAc) at a weight ratio of 3:1) were put in a secondary feed tank. The butylene glycol adipate-terephthalate copolymer, the coupling agent A, and the cocatalyst were melted and blended at a temperature of 205° C. in the twin screw extruder that has L/D=36, rotation speed of 50 rpm, and screw temperatures of 140° C., 160° C., 180° C., 200° C., 200° C., 200° C., and 200° C., followed by extruding through a die which was at a temperature of 200° C. and cutting into a plurality of pellets by a pelletizer. The feed speeds for the primary and secondary feed tanks were respectively 40 kg/hr and 0.286 kg/hr. The resulting copolyester pellets were dried and weighed (95 kg, yield 95%). The relative viscosity (RV) and the acid value of the copolyester pellets were measured and are shown in Table 6.

Second Processing in Twin Screw Extruder 95 kg of the copolyester pellets prepared from the first processing were put in the primary feed tank of the twin screw extruder, and 5 kg of talc powders were put in the secondary feed tank to conduct a second processing so as to obtain a blend. The feed speeds for the primary and secondary feed tanks were respectively 40 kg/hr and 2 kg/hr. A 120 mesh filter was disposed upstream the die of the twin screw extruder so as to filter impurities. The resulting copolyester product was dried and weighed (95 kg, yield 95%). The measurement results of relative viscosity (RV) and acid value of the copolyester product are shown in Table 6.

Third Processing in Single Screw Film Blowing Machine 50 kg of the copolyester product made from the second processing and having a temperature of 150° C. were put in a feed tank of a single screw film blowing machine that has L/D=32, rotation speed of 25 rpm, and screw temperatures of 160° C., 170° C., and 170° C. The copolyester product was melted in the machine and extruded into a circular die having a temperature of 170° C., followed by a film-blowing process so as to form a film bag having a thickness ranging from 20 to 25 μm. The feed speed of the feed tank of the single screw film blowing machine was 40 kg/hr. The measurement results of the relative viscosity (RV) and acid value of the film bag are shown in Table 6. The mechanical properties of the film bag were measured using an Instron tensile machine under a trade name of Instron 5566 and the results are shown in Table 7.

Examples 9 and 10 and Comparative Examples 10 to 12

The processes for preparing film bags of Example 9 and 10 and Comparative Examples 10 to 12 were the same as those of Example 8, except that the species and amounts of the cocatalyst were different. The species and amounts of the cocatalyst are shown in Table 5. The relative viscosity and acid value of the copolyester pellets obtained by first processing, the copolyester product obtained by second processing, and the film bags obtained by third processing in Examples 9 and 10 and Comparative Examples 10 to 12 were measured respectively. The results are shown in Table 6. The mechanical properties of the film bags made from Examples 9 and 10 and Comparative Examples 10 to 12 are shown in Table 7.

TABLE 5

| | | | Processing | | | | | |
| --- | --- | --- | --- | --- | --- | --- | --- | --- |
| | | | First 200° C. (Pellets) | | Second 200° C. | | Third 170° C. | |
| Example/ Comparative Example (CE) | Species of cocatalyst | Amount of cocatalyst (kg) | RV* | Acid value | RV* | Acid value | RV* | Acid value |
| 8 | MnAc/ZnAc (3:1) | 0.065 | 2.35 | 41.0 | 2.30 | 43.5 | 2.25 | 45.0 |
| 9 | MnAc/ZnAc (1:1) | 0.065 | 2.45 | 35.1 | 2.35 | 40.5 | 2.30 | 44.0 |
| 10 | MnAc/ZnSt (1:1) | 0.065 | 2.35 | 42.3 | 2.27 | 45.0 | 2.20 | 47.1 |
| CE10 | — | — | 1.80 | 65.0 | 1.70 | 72.5 | 1.60 | 80.0 |
| CE11 | ZnSt | 0.065 | 2.30 | 40.2 | 2.15 | 50.6 | 1.95 | 63.1 |
| CE12 | MnAc/ZnAc (4:1) | 0.065 | 2.15 | 51.3 | 2.13 | 54.4 | 2.00 | 60.8 |

*RV = relative viscosity

TABLE 6

| Example/ Comparative Example (CE) | Relative viscosity (RV) | Thickness (μm) | Appearance | | |
| --- | --- | --- | --- | --- | --- |
| | | | Formability | Touch feeling | Gel particles |
| 8 | 2.25 | 25 | good | slippery | none |
| 9 | 2.30 | 25 | good | slippery | none |
| 10 | 2.20 | 25 | good | slippery | none |
| CE10 | 1.6 | NA | NA | NA | NA |
| CE11 | 1.95 | 25 | good | slippery | none |
| CE12 | 2.00 | 25 | good | slippery | none |

TABLE 7

| Example/ Comparative Example (CE) | Longitudinal Properties | | Transverse Properties | |
|---|---|---|---|---|
| | Tear strength (Mpa) | Elongation at break (%) | Tear strength (Mpa) | Elongation at break (%) |
| 8 | 8.5 | 600.1 | 7.8 | 540.1 |
| 9 | 9.0 | 620.1 | 8.2 | 600.5 |
| 10 | 8.5 | 584.1 | 7.6 | 518.5 |
| CE10 | — | — | — | — |
| CE11 | 5.9 | 485.3 | 5.0 | 443.4 |
| CE12 | 6.1 | 502.1 | 5.2 | 473.3 |

The acid value is proportional to the number of terminal carboxyl groups of the resulting copolyester pellet/product and film bag. The terminal carboxyl group comes from a chain-breaking reaction of the resulting copolyester pellet/product and film bag. That is to say, a higher acid value indicates more chain-breaking reactions occur during the preparation process, which results in more terminal carboxyl groups and a lower molecular weight of the resulting copolyester pellet/product and film bag. Moreover, a lower relative viscosity (RV) indicates a lower molecular weight of the resulting copolyester pellet/product and film bag. In conclusion, a lower RV and a higher acid value indicate poor thermostability of the copolyester pellet/product and film bag.

From the measurement results of Tables 5 to 7, Comparative Example 10, which contains no catalyst, has a RV lower than 1.8 and a relatively high acid value that increases during processing. Comparative Example 11, which contains a catalyst of merely one species, has an acid value that increases from 40.2 to 63.1 after the multiple processing. Comparative Example 12, which has a cocatalyst of MnAc/ZnAc at a weight ratio of 4:1, has a low RV equal to 2.0 that indicates a low catalyst efficiency of the cocatalyst.

According to the measurement results of Examples 8 to 10, higher relative viscosities and lower acid values are acquired, which indicates superior thermostability thereof. In addition, the resulting resin film bag of each of Examples 8 to 10 has superior mechanical properties compared to those of Comparative Examples 10 to 12. After multiple processing at an elevated temperature, the resulting film bags made according to the present invention still exhibit great physical properties as good as, even better than, the conventional plastic materials, polyethylene (PE).

By controlling the species and amounts of the cocatalyst of the copolyester composition, the aliphatic-aromatic copolyester thereof may react with the coupling agent including a compound having an epoxy functional group efficiently during manufacturing processes. Moreover, the resulting copolyester polymer is thermo-stable and has great physical and mechanical properties such as high melting strength even after multiple processing.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A copolyester composition comprising:
   an aliphatic-aromatic copolyester;
   a coupling agent including a compound having an epoxy functional group; and
   a cocatalyst including a carboxylate of manganese and a carboxylate of zinc, wherein a weight ratio of said carboxylate of manganese to said carboxylate of zinc ranges from 1:3 to 3:1, and said cocatalyst is present in an amount ranging from 0.03-0.2 part by weight based on 100 parts by weight of said aliphatic-aromatic copolyester.

2. The copolyester composition of claim 1, wherein said carboxylate of manganese is a C1 to C18 aliphatic carboxylate of manganese.

3. The copolyester composition of claim 2, wherein said carboxylate of manganese is manganese acetate or manganese stearate.

4. The copolyester composition of claim 1, wherein said carboxylate of zinc is a C1 to C18 aliphatic carboxylate of zinc.

5. The copolyester composition of claim 4, wherein said carboxylate of zinc is zinc acetate or zinc stearate.

6. The copolyester composition of claim 1, wherein said aliphatic-aromatic copolyester includes a first repeating unit represented by the following formula (I) and a second repeating unit represented by the following formula (II):

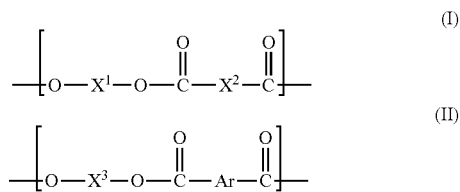

wherein $X^1$ and $X^3$ are independently $C_2$ to $C_{20}$ linear or branched alkylene, $X^2$ is $C_3$ to $C_{40}$ linear or branched alkylene, and Ar is $C_6$ to $C_{20}$ arylene, wherein a mole ratio of said first repeating unit of formula (I) to said second repeating unit of formula (II) ranges from 0.1:99.9 to 99.9:0.1.

7. The copolyester composition of claim 1, wherein said aliphatic-aromatic copolyester is selected from the group consisting of butylene glycol adipate-terephthalate copolymer, butylene glycol succinate-terephthalate copolymer, and tetramethyladipate-terephthalate copolymer.

8. The copolyester composition of claim 1, wherein said aliphatic-aromatic copolyester has a weight average molecular weight ranging from 30,000 to 50,000.

9. The copolyester composition of claim 1, wherein said coupling agent is present in an amount ranging from 0.3-2.0 parts by weight based on 100 parts by weight of said aliphatic-aromatic copolyester.

10. The copolyester composition of claim 1, wherein said coupling agent has a weight average molecular weight ranging from 5,000 to 20,000.

11. The copolyester composition of claim 1, wherein said coupling agent has an epoxy equivalent weight ranging from 200 to 500 g/eq.

12. The copolyester composition of claim 1, wherein said coupling agent is prepared by polymerizing at least one first monomer of an epoxidized acrylic ester that includes an epoxy functional group, and a second monomer selected from the group consisting of acrylic ester based monomer, styrene based monomer, and the combination thereof.

13. The copolyester composition of claim 12, wherein said first monomer and said second monomer are respectively present in amounts of 30-50 wt % and 50-70 wt % based on the weight of said coupling agent.

14. A method for producing a thermo-stable copolyester polymer, comprising reacting an aliphatic-aromatic copolyester with a coupling agent that includes an epoxy functional group in the presence of a cocatalyst;
wherein the cocatalyst includes a carboxylate of manganese and a carboxylate of zinc at a weight ratio ranging from 1:3 to 3:1, and the cocatalyst is present in an amount ranging from 0.03-0.2 part by weight based on 100 parts by weight of the aliphatic-aromatic copolyester.

15. The method of claim 14, wherein the carboxylate of manganese is a $C_1$ to $C_{18}$ aliphatic carboxylate of manganese, and the carboxylate of zinc is a $C_1$ to $C_{18}$ aliphatic carboxylate of zinc.

16. The method of claim 15, wherein the carboxylate of manganese is manganese acetate or manganese stearate, and the carboxylate of zinc is zinc acetate or zinc stearate.

17. The method of claim 14, wherein the aliphatic-aromatic copolyester includes a first repeating unit represented by the following formula (I) and a second repeating unit represented by the following formula (II):

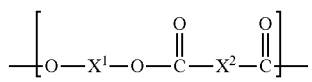 (I)

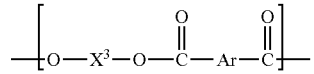 (II)

wherein $X^1$ and $X^3$ are independently $C_2$ to $C_{20}$ linear or branched alkylene, $X^2$ is $C_3$ to $C_{40}$ linear or branched alkylene, and Ar is $C_6$ to $C_{20}$ arylene, and wherein a mole ratio of the first repeating unit of formula (I) to the second repeating unit of formula (II) ranges from 0.1:99.9 to 99.9:0.1.

18. The method of claim 17, wherein the aliphatic-aromatic copolyester is selected from the group consisting of butylene glycol adipate-terephthalate copolymer, butylene glycol succinate-terephthalate copolymer, and tetramethyladipate-terephthalate copolymer.

19. The method of claim 14, further comprising preparing the coupling agent by polymerizing at least one first monomer of an epoxidized acrylic ester that includes an epoxy functional group, and a second monomer selected from the group consisting of acrylic ester based monomer, styrene based monomer, and the combination thereof.

20. A thermo-stable copolyester polymer that is made from the method claimed in claim 14.

* * * * *